United States Patent
Bae et al.

(10) Patent No.: US 7,394,491 B2
(45) Date of Patent: Jul. 1, 2008

(54) IMAGE SENSOR HAVING CLAMP CIRCUIT

(75) Inventors: Chang-Min Bae, Ichon-shi (KR); Kwang-Ho Yoon, Ichon-shi (KR)

(73) Assignee: MagnaChip Semiconductor, Ltd., Cheong Bok-Do (KR)

( * ) Notice: Subject to any disclaimer, the term of this patent is extended or adjusted under 35 U.S.C. 154(b) by 781 days.

(21) Appl. No.: 10/749,340

(22) Filed: Dec. 30, 2003

(65) Prior Publication Data

US 2004/0155973 A1 Aug. 12, 2004

(30) Foreign Application Priority Data

Jan. 13, 2003 (KR) .................. 10-2003-0002189

(51) Int. Cl.
*H04N 5/217* (2006.01)
*H04N 5/16* (2006.01)
*H04N 3/14* (2006.01)
*H04N 5/335* (2006.01)

(52) U.S. Cl. .................. 348/241; 348/257; 348/308

(58) Field of Classification Search .............. 348/241, 348/364, 257, 294, 308; 250/208.1
See application file for complete search history.

(56) References Cited

U.S. PATENT DOCUMENTS

| | | | |
|---|---|---|---|
| 5,659,355 A | 8/1997 | Barron et al. | |
| 5,708,482 A * | 1/1998 | Takahashi et al. | 348/695 |
| 5,717,457 A | 2/1998 | Morimoto | |
| 5,881,184 A | 3/1999 | Guidash | |
| 5,900,623 A | 5/1999 | Tsang et al. | |
| 6,031,891 A | 2/2000 | Roos et al. | |
| 6,040,570 A | 3/2000 | Levine et al. | |
| 6,396,505 B1 | 5/2002 | Lui et al. | |
| 6,441,852 B1 | 8/2002 | Levine et al. | |
| 6,587,143 B1 | 7/2003 | Boisvert | |
| 6,670,904 B1 * | 12/2003 | Yakovlev | 341/167 |
| 7,196,726 B2 * | 3/2007 | Kokubun et al. | 348/308 |
| 2001/0028392 A1 | 10/2001 | Yamamoto et al. | |
| 2002/0001038 A1 | 1/2002 | Lee | |
| 2003/0002093 A1 | 1/2003 | Hynecek | |
| 2003/0020818 A1 | 1/2003 | Johnson | |

(Continued)

FOREIGN PATENT DOCUMENTS

JP 05-183913 7/1993

(Continued)

*Primary Examiner*—Ngoc-Yen T. Vu
*Assistant Examiner*—Albert H Cutler
(74) *Attorney, Agent, or Firm*—Blakely, Sokoloff, Taylor & Zafman LLP

(57) ABSTRACT

An image sensor of the present invention prevents the phenomenon that surrounding background of a bright object reflecting or emitting strong light like the sun is presented at dark and improves image quality of the image sensor by controlling the brightness of the bright object. The image sensor using correlated double sampling technology which outputs data of an object by using difference between a reset voltage signal and a data voltage signal of a unit pixel includes a plurality of unit pixels arranged in a matrix, each outputting the reset voltage signal and the data voltage signal; a plurality of clamping means, each coupled to each unit pixels for clamping up the reset signal to a predetermined voltage level; and a voltage controlling block for adjusting voltage level supplied to a gate of each of clamping means.

10 Claims, 6 Drawing Sheets

U.S. PATENT DOCUMENTS

| | | | |
|---|---|---|---|
| 2003/0133627 A1* | 7/2003 | Brehmer et al. | 382/308 |
| 2003/0146993 A1* | 8/2003 | Kokubun et al. | 348/308 |

FOREIGN PATENT DOCUMENTS

| | | |
|---|---|---|
| JP | 11-2200662 | 8/1999 |
| JP | 2000-050167 | 2/2000 |
| JP | 2000-270267 | 9/2000 |
| JP | 2000-287135 | 10/2000 |
| JP | 2001-036690 | 2/2001 |
| JP | 2002-044524 | 2/2002 |
| JP | 2002-232741 | 8/2002 |
| JP | 2002-300477 | 10/2002 |

* cited by examiner

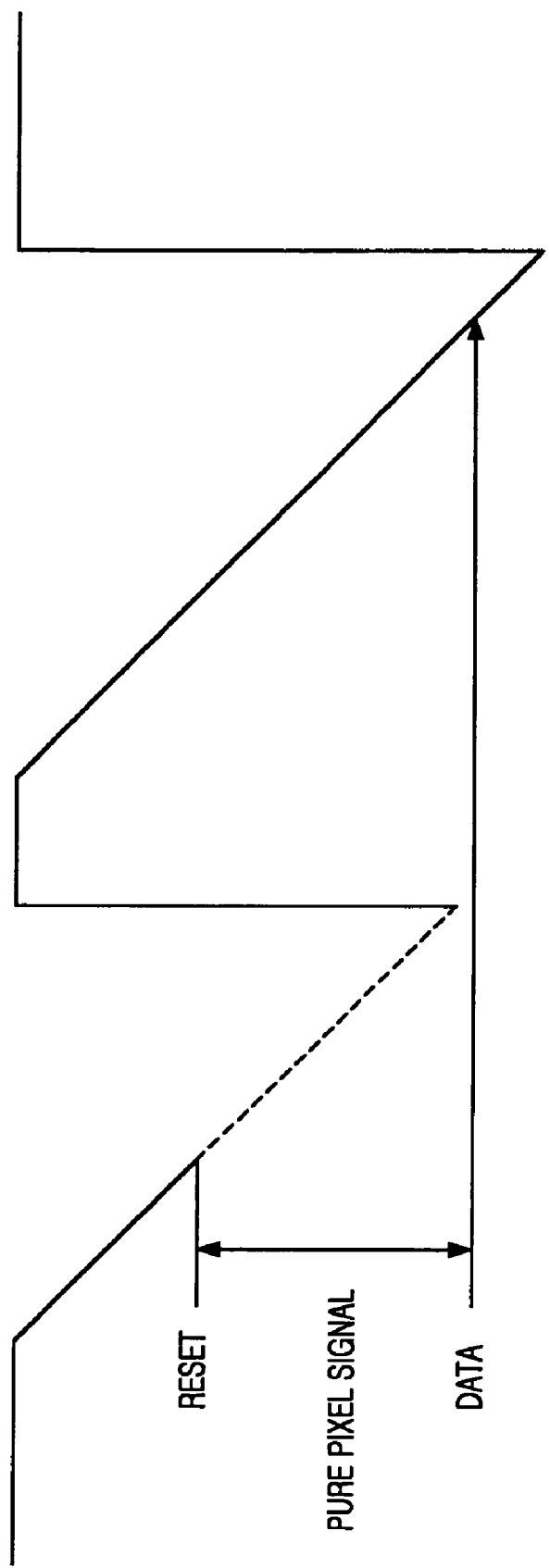

IMAGE SENSOR HAVING CLAMP CIRCUIT

FIELD OF INVENTION

The present invention relates to an image sensor; and, more particularly, to the image sensor capable of preventing a phenomenon that an object, e.g., a light source like the sun becomes darker than a real image when strong light is inputted from the object.

DESCRIPTION OF PRIOR ART

An image sensor is a device for picking up light images by using a property, which causes a semiconductor to react to the light. Particularly, complementary metal oxide semiconductor (hereinafter, referred to a CMOS) devices are generally used in image sensors. A CMOS image sensor is designed by using a CMOS technology for designing a general control circuit or a signal processing circuit. In the CMOS image sensor, each pixel outputs electrical signals converted from optical values detected by each photodiode. Then, each MOS transistor connected to each pixel delivers the electrical signals to a signal processing unit.

Meanwhile, the image sensor has a fixed pattern noise generated by an offset voltage generated at a manufacturing process. In order to compensate the fixed pattern noise, the image sensor should read a data voltage signal after reading a reset voltage signal of each pixel. After reading the reset voltage signal and the data voltage signal, the image sensor outputs the difference between the reset voltage signal and the data voltage signal. This way is called as a correlated double sampling method (hereinafter, referred as CDS method).

FIG. 1A is a schematic diagram showing a unit pixel of a conventional image sensor. The unit pixel of the conventional image sensor includes a photodiode PD, a transfer transistor Tx, a reset transistor Rx, a drive transistor Dx and a selection transistor Sx.

The photodiode PD receives light reflected or emitted from an object and a background to generate a photo-generated charge. The transfer transistor Tx is used for transmitting the photo-generated charge to a floating node FN. The reset transistor Rx sets a voltage level of the floating node FN into a predetermined value. The drive transistor Dx serves as a source follower buffer amplifier. The selection transistor Sx serves as a switch for addressing a pixel output signal.

The CDS method using the unit pixel of the image sensor has the following steps. First, the transfer transistor Tx, the reset transistor Rx and the select transistor Sx are turned off. At this time, the photodiode PD is in a depletion state. Second, the photodiode PD having little charge starts on gathering the photo-generated charge. Third, the reset transistor Rx is turned on after a predetermined integration time and the floating node FN is reset. Forth, the selection transistor Sx is turned on for turning on the unit pixel. Fifth, an output voltage V1 from the drive transistor Dx as a source follower buffer amplifier is measured. The first output voltage V1 means DC level shift of the floating node FN. Sixth, the transfer transistor Tx is turned on for transmitting all photo-generated charge to the floating node FN. Seventh, the transfer transistor Tx is turned off. Eighth, a second output voltage V2 outputted from the drive transistor Dx is measured. Ninth, the pixel output signal as the difference, i.e., V1−V2, between the first output voltage V1 and the second output voltage V2 of the drive transistor Dx is outputted. Herein, the pixel output signal, i.e., V1−V2 can be considered as pure data value except for any noise.

In the CDS method, the first to ninth steps are repeated during the operation of the image sensor. Furthermore, in the sixth step, the photodiode PD should be in the depletion state.

FIG. 1B is a graph describing a voltage level outputted from the unit pixel, as shown in FIG. 1A, in case of injecting week light into the conventional unit pixel.

The reset voltage signal RESET is determined by sampling voltage level of the floating node FN after the reset transistor Rx is turned on. The reset voltage signal RESET has a large voltage level close to a supply voltage. However, the data voltage signal DATA is determined by sampling voltage level of the floating node FN after all photo-generated charge generated from the photodiode PD is transmitted to the floating node FN. The data voltage signal is larger than the reset voltage signal RESET.

FIG. 1C is a graph describing voltage level outputted from the unit pixel in case of coupling a strong light into the conventional unit pixel. The voltage level of the pixel output signal is relatively small because it is difference between the reset voltage signal and the data voltage signal.

Using CDS method so that a noise is eliminated by outputting the difference between the reset voltage signal and the data voltage signal, the image sensor shows bright or dark objects in a picture. However, the conventional image sensor cannot naturally reproduce the bright object, e.g., the sun emitting strong light or something to reflect the strong light because the difference is decreased.

Hereinafter, there is described why the difference between the reset voltage signal and the data voltage signal becomes small if the bright object is inputted to the image sensor.

In CDS method, after the reset transistor Rx is turned on for resetting the floating node FN, a buffer (as not shown) stores value of sampling the reset voltage signal. At this time, the floating node FN is supplied with the supply voltage, so the reset voltage signal has relatively high voltage level.

However, in case about the bright object, the photo-generated charge is generated from not only the photodiode PD but also the floating node, because the floating node made by a PN junction is exposed to strong light emitted or reflected from the bright object. Namely, under the bright object, the floating node FN may generate a lot of photo-generated charge because the floating node serves as a photodiode.

A large amount of photo-generated charges generated by the bright object draws down the voltage level of the floating node FN by overcoming affect of the supply voltage VDD when the reset transistor Rx is turned on and the reset voltage signal is sampled.

After all, because the reset voltage signal becomes below a predetermined voltage, the unit pixel, in a reset state, outputs value which is similar to the data voltage signal. As a result, the reset voltage signal is not quite different from the data voltage signal, and the bright object is darkly reproduced. This dark phenomenon results in decreasing a quality of the image sensor related to image reproduction.

Thus, the above phenomenon should be prevented in order to guarantying a product quality related to optical characteristic of the image sensor using CDS method.

SUMMARY OF INVENTION

It is, therefore, an object of the present invention to provide an image sensor for effectively reducing a dark phenomenon in a bright object, e.g., a light source to thereby improve a quality of an image sensor using CDS method.

In accordance with an aspect of the present invention, there is provided an image sensor using correlated double sampling technology which outputs data of an object by using difference between a reset voltage signal and a data voltage signal of a unit pixel includes a plurality of unit pixels arranged in a matrix, each outputting the reset voltage signal and the data voltage signal; a plurality of clamping means, each coupled to each unit pixels for clamping up the reset signal to a predetermined voltage level; and a voltage controlling block for adjusting voltage level supplied to a gate of each of clamping means.

BRIEF DESCRIPTION OF THE DRAWINGS

The above and other objects and features of the instant invention will become apparent from the following description of preferred embodiments taken in conjunction with the accompanying drawings, in which:

FIG. 2B is a graph describing a voltage level outputted from the unit pixel of the image sensor having the clamp circuit in accordance with the embodiment of the present invention in case of injecting a strong light into the unit pixel.

DETAILED DESCRIPTION OF INVENTION

In order to prevent a dark phenomenon that a bright object, e.g., a sun reflecting or emitting strong light, is rather darkly shown in an image frame, a voltage level of a reset voltage signal is maintained greater than or identical to a predetermined voltage level at the reading operation of the reset voltage signal.

Hereinafter, an image sensor using a correlated double sampling method (hereinafter, referred as CDS method) will be described in detail with reference to the accompanying drawings.

Figure 1A:
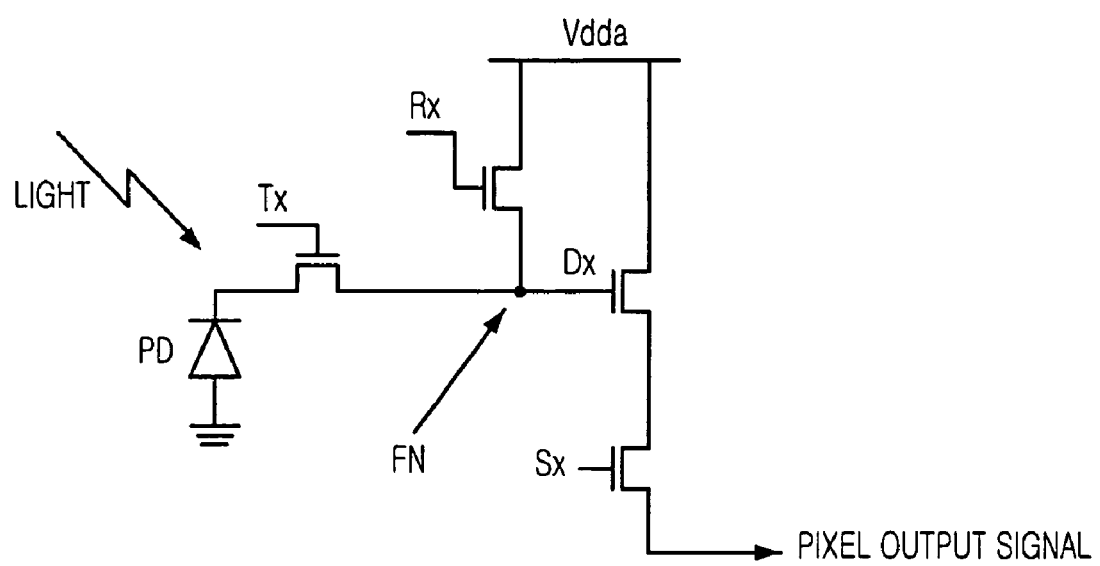
FIG. 1A is a schematic diagram showing a unit pixel of a conventional image sensor.
Figure 1B:
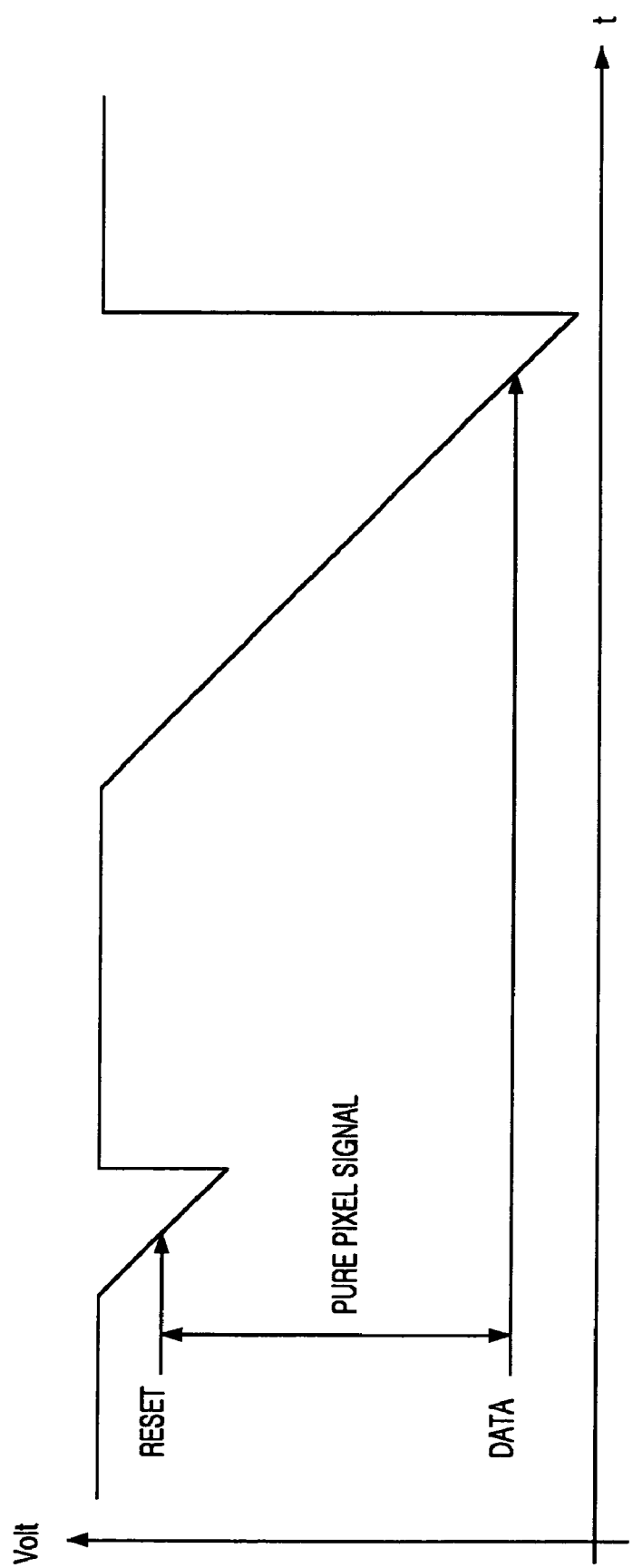
FIG. 1B is a graph describing a voltage level outputted from the unit pixel in case of injecting a week light into the conventional unit pixel.
Figure 1C:
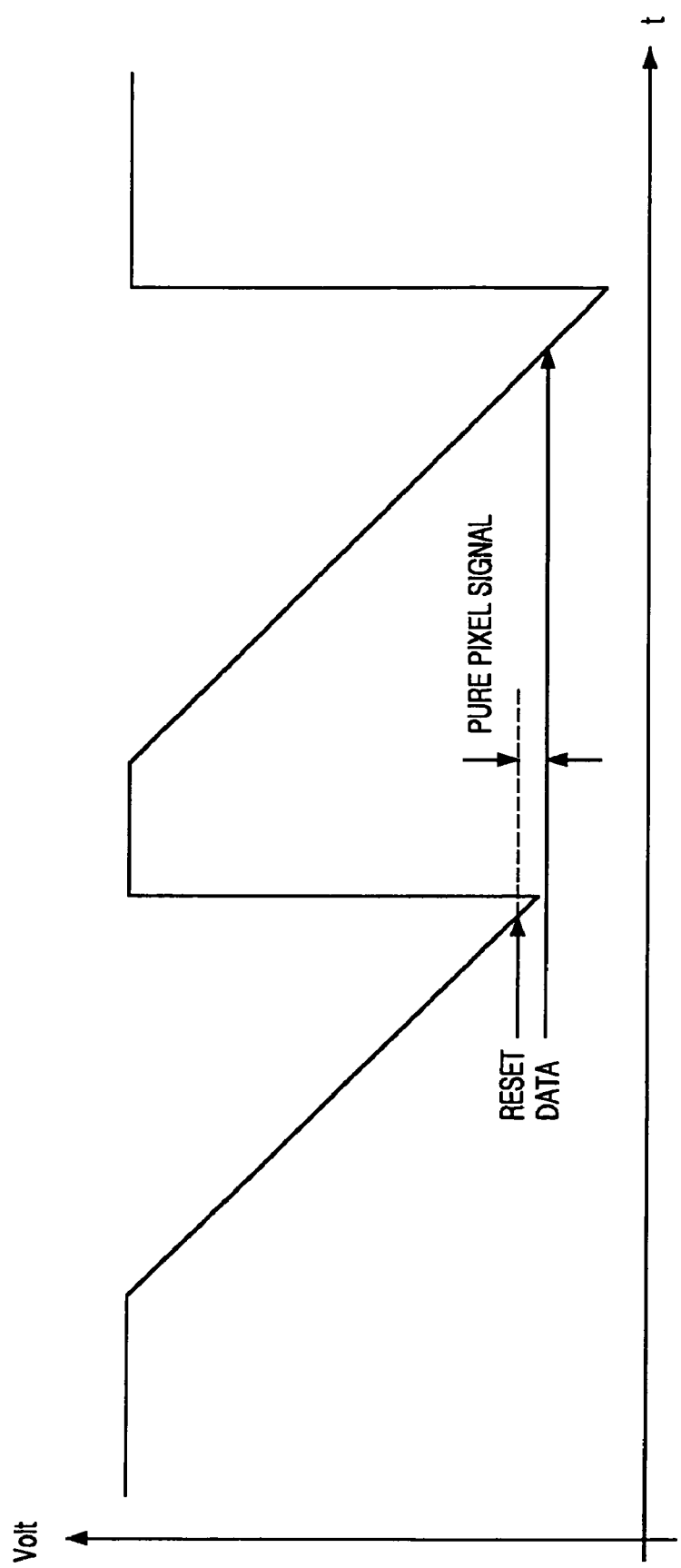
FIG. 1C is a graph describing voltage level outputted from the unit pixel in case of coupling a strong light into the conventional unit pixel.
Figure 2A:
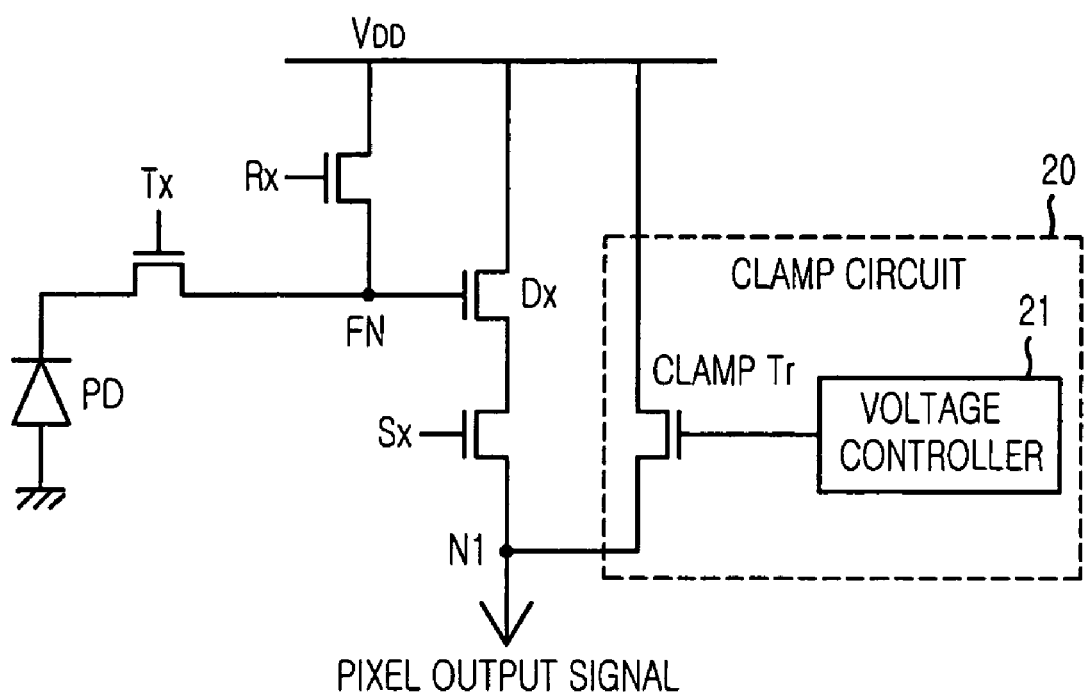
FIG. 2A is a schematic diagram depicting a unit pixel of an image sensor having a clamp circuit in accordance with an embodiment of the present invention.

FIG. 2A is a schematic diagram depicting a unit pixel of an image sensor having a clamp circuit in accordance with an embodiment of the present invention. FIG. 2B is a graph describing a voltage level outputted from the unit pixel of the image sensor having the clamp circuit in accordance with the embodiment of the present invention in case of injecting a strong light into the unit pixel. Referring to FIG. 2, because the voltage level of the reset voltage signal is prevented from being below a predetermined voltage level, the difference from the data signal is greater than or identical to a predetermined value so that the dark phenomenon that the bright object is darkly reproduced is prevented.

Referring to FIG. 2A, the unit pixel of the image sensor includes a photodiode PD, a transfer transistor Tx, a reset transistor Rx, a drive transistor Dx and a selection transistor Sx. The photodiode PD receives light outputted from the bright object and its background to generate photo-generated charge. The transfer transistor Tx is used for transmitting the photo-generated charge to a floating node FN. The reset transistor Rx sets a voltage level of the floating node FN to a predetermined value. The drive transistor Dx serves as a source follower buffer amplifier. The selection transistor Sx serves as a switch for outputting a pixel output signal.

Furthermore, the unit pixel of the image sensor includes a clamp circuit 20. In detail, the clamp circuit 20 has a clamp transistor Cx and a voltage controller 21. Source of the clamp transistor Cx is coupled to an output terminal of the unit pixel, i.e., source of the select transistor Sx. The drain of the clamp transistor Cx is coupled to a supply voltage and the gate of the clamp transistor Cx is coupled to an output terminal of the voltage controller 21. Herein, the clamp transistor is needed at each column of a unit pixel array having M×N unit pixels. But, in a chip of the image sensor, there can be needed only one voltage controller 21.

The clamp circuit 20 in accordance with an embodiment of the present invention is operated when the reset voltage signal is outputted, in order not to decrease the reset voltage under a predetermined voltage level. Meanwhile, when the data voltage signal is outputted, the voltage controller 21 outputs a logic low signal. So, the clamp transistor Cx is not operated.

In addition, even if the reset voltage signal is outputted, the clamp circuit 20 in accordance with an embodiment of the present invention is operated in case when the image sensor is exposed at strong light, not in case when the image sensor is exposed at week light. That is, the clamp circuit 20 is operated only when the image sensor is exposed at strong light and the reset voltage signal is outputted from the unit pixel of the image sensor.

Hereinafter, in detail, there is described operation of the clamp transistor Cx in two cases: one case is that the image sensor is exposed at strong light and the other case is that the image sensor is exposed at week light.

It is assumed that the gate of the clamp transistor Cx is supplied with a predetermined voltage level when the reset voltage signal is outputted from the unit pixel. If the threshold voltage of the clamp transistor Cx is 0.7 volt, a voltage outputted from the source of the clamp transistor Cx is about less 0.7 volt than a voltage supplied at the gate of the clamp transistor Cx.

However, when the image sensor is exposed at week light, the voltage supplied in an output node N1, i.e., the source of the selection transistor Sx and the clamp transistor Cx is not less 0.7 volt than the voltage supplied at the gate of the clamp transistor Cx but a high level voltage insomuch that the clamp transistor Cx is not turned on.

Namely, the reset transistor Rx is turned on and then the floating node is supplied with a sufficiently high voltage level. As a result, the clamp transistor Cx is not operated because the source of the clamp transistor Cx is supplied with a high level voltage.

Otherwise, when the image sensor is exposed at strong light, the clamp transistor is normally operated. First, in this case, as described above, the floating node FN serves as a photodiode and generates a lot of photo-generated charge.

Thus, by a lot of photo-generated charge which is generated in the floating node FN, the voltage level of the floating node FN is largely decreased and the voltage level supplied at the sources of the select transistor Sx and the clamp transistor Cx is also largely decreased. Then, if the voltage supplied at the gate of the clamp transistor Cx is more 0.7 volt than the voltage level supplied at the sources of the select transistor Sx and the clamp transistor Cx, the clamp transistor Cx starts to be operated. Hereinafter, the voltage level supplied at source of a transistor is referred as a source voltage and the voltage level supplied at gate of a transistor is referred as a gate voltage.

Herein, the source voltage of the clamp transistor Cx changes in response to the gate voltage of the clamp transistor Cx. Also, the gate voltage of the clamp transistor Cx can be optionally controlled. In the voltage level of the gate of the clamp transistor Cx, it is determined whether the bright object is reproduced naturally or darkly. In the present invention, the gate voltage of the clamp transistor Cx is controlled by a 4-bit digital code inputted or set by a user.

Namely, if the gate voltage of the clamp transistor Cx is let down, the reset voltage signal is also decreased and the pixel output signal, i.e., the difference between the reset voltage signal and the data voltage signal, becomes smaller. Then, the bright object is darkly reproduced.

Otherwise, if the gate voltage of the clamp transistor Cx is high, the reset voltage signal is also increased and the pixel output signal, i.e., the difference between the reset voltage signal and the data voltage signal, becomes larger. As a result, the bright object can be bright reproduced.

Figure 3:
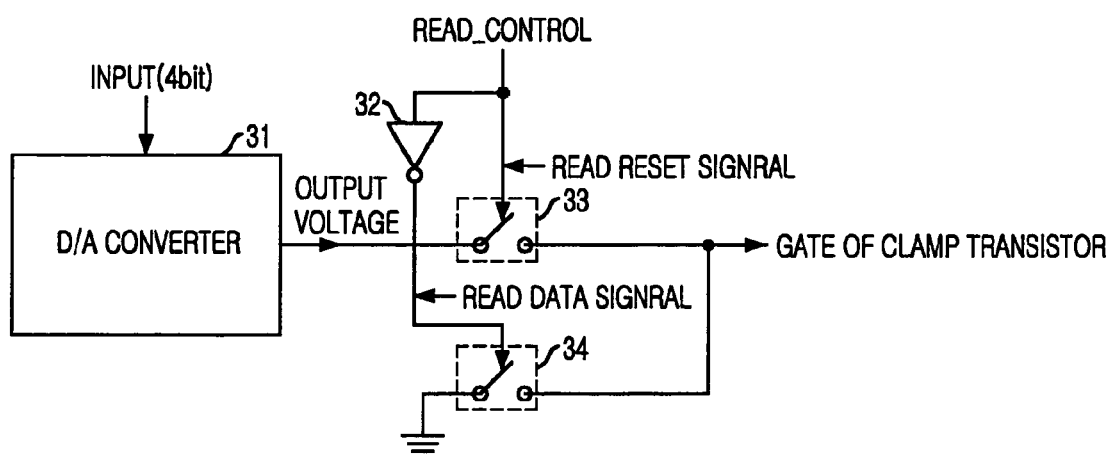
FIG. 3 is a schematic diagram describing a voltage controller in the clamp circuit in accordance with an embodiment of the present invention.

FIG. 3 is a schematic diagram describing the voltage controller 21 in the clamp circuit 20 in accordance with an embodiment of the present invention. The voltage controller 21 adjusts the gate voltage of the clamp transistor Cx so that the clamp transistor Cx is turned on or off. Therefore, the bright object is naturally reproduced by controlling the brightness of the bright object.

As shown, the voltage controller 21 in accordance with an embodiment of the present invention includes a D/A converting unit for receiving the 4-bit digital code in order to adjust the gate voltage of the clamp transistor Cx and outputting an analog voltage signal, a first switch 33 coupled between the D/A converting unit and the clamp transistor Cx, and a second switch 34 coupled between a ground voltage and the clamp transistor Cx. The first switch 33 is controlled by a read control signal READ_CONTROL. The second switch 34 is controlled by the inverse read control signal /READ_CONTROL. Herein, the 4-bit digital code is generated from an auto-controller of the image sensor (not shown) or inputted by users. Namely, the 4-bit digital code means a degree of resolution about the inputted image.

The voltage controller 21 of the present invention uses the 4-bit digital code for controlling the gate voltage of the clamp transistor Cx, but can use a D/A converting unit which receives a code having more bits than 4 bits in order to controlling the voltage level supplied in the gate of the clamp transistor Cx.

Hereinafter, operation of the voltage controller 21 is described in detail.

First, as above statement, the clamp transistor Cx is operated when the reset voltage signal is outputted, not when the data voltage signal is outputted. This operation is controlled by the read control signal READ_CONTROL.

In general, the read control signal READ_CONTROL is activated when the reset voltage signal is outputted and the read control signal READ_CONTROL is inactivated when the data voltage signal is outputted.

First, the first switch 33 is turned off and the second switch 34 is turned on when the read control signal READ_CONTROL is inactivated. Thus, the ground voltage is supplied at the gate of the clamp transistor Cx.

Otherwise, when the read control signal READ_CONTROL is activated, the first switch 33 is turned on and the second switch 34 is turned off. So, an output of the D/A converting unit 31 is inputted to the gate of the clamp transistor Cx by the first switch 33, so the clamp transistor Cx is operated.

As described above, the clamp circuit 20 in accordance with the embodiment of the present invention can upgrade an image quality of the image sensor. Also, since the clamp circuit 20 includes one clamp transistor contained in a unit pixel and one control circuit included in an image sensor, the clamp circuit 20 does not affect size of the die. Thus, products using the image sensor of the present invention can have an advantage with keeping price competitiveness for products using a conventional image sensor.

The image sensor of the present invention can not only prevent the dark phenomenon that a bright object reflecting or emitting strong light like the sun is darkly reproduced, but also improve image quality of the image sensor by controlling the degree of resolution about the image including the bright object.

While the present invention has been described with respect to the particular embodiments, it will be apparent to those skilled in the art that various changes and modifications may be made without departing from the spirit and scope of the invention as defined in the following claims.

What is claimed is:

1. An image sensor using correlated double sampling technology which outputs data of an object by using difference between a reset voltage signal and a data voltage signal of a unit pixel, comprising:
 a plurality of unit pixels arranged in a matrix, each outputting the reset voltage signal and the data voltage signal;
 a plurality of clamping means, each coupled to each unit pixels for clamping up the reset signal to a predetermined voltage level; and a voltage controlling block for adjusting voltage level supplied to a gate of each of clamping means, wherein the voltage controlling block includes:
 a D/A converting means for receiving a digital code and outputting an analog voltage used to adjust the voltage level;
 a first switch coupled between the D/A converting means and the clamping means and controlled by a first control signal; and
 a second switch coupled between a ground voltage and the clamping means and controlled by an inverse of the first control signal.

2. The image sensor as recited in claim 1, wherein the voltage controlling block includes an inverter, connected to the second switch, for inverting the first control signal.

3. The image sensor as recited in claim 1, wherein each clamping means is composed of one MOS transistor coupled between supply voltage and an output node of each pixel.

4. The image sensor as recited in claim 3, wherein the first switch is coupled to a gate of the MOS transistor of clamping means.

5. The image sensor as recited in claim 1, wherein each clamping means is included in each column of the matrix and one voltage controlling block is in whole chip of one image sensor.

6. An image sensor using correlated double sampling technology which outputs data of an object by using difference between a reset voltage signal and a data voltage signal of a unit pixel, comprising:
 a plurality of unit pixels arranged in a matrix, each outputting the reset voltage signal and the data voltage signal;
 a plurality of clamping units, each coupled to one of the unit pixels for clamping up the reset signal to a predetermined voltage level; and
 a voltage controlling block for adjusting voltage level supplied to a gate of each clamping unit,
wherein the voltage controlling block includes:
 a D/A converter for receiving a digital code and outputting an analog voltage used to adjust the voltage level;

a first switch coupled between the D/A converter and one of the clamping units and controlled by a first control signal; and a second switch coupled between a ground voltage and said one of the clamping units and controlled by an inverse of the first control signal.

7. The image sensor as recited in claim 6, wherein the voltage controlling block Includes an inverter, connected to the second switch, for inverting the first control signal.

8. The image sensor as recited in claim 6, wherein each clamping unit is composed of one MOS transistor coupled between supply voltage and an output node of each pixel.

9. The image sensor as recited in claim 8, wherein the first switch is coupled to a gate of the MOS transistor of clamping unit.

10. The image sensor as recited in claim 6, wherein each clamping unit is included in each column of the matrix and one voltage controlling block is in whole chip of one image sensor.

\* \* \* \* \*

UNITED STATES PATENT AND TRADEMARK OFFICE
CERTIFICATE OF CORRECTION

PATENT NO. : 7,394,491 B2 Page 1 of 1
APPLICATION NO. : 10/749340
DATED : July 1, 2008
INVENTOR(S) : Chang-Min Bae and Kwang-Ho Yoon It is certified that error appears in the above-identified patent and that said Letters Patent is hereby corrected as shown below:

Column 2, line 6, delete "week" and insert --weak--;

Column 3, line 19, delete "week" and insert --weak--;

Column 4, line 26, delete "week" and insert --weak--;

Column 4, line 32, delete "week" and insert --weak--; and,

Column 4, line 40, delete "week" and insert --weak--.

Signed and Sealed this

Thirty-first Day of August, 2010

David J. Kappos
*Director of the United States Patent and Trademark Office*